Oct. 8, 1935.  E. W. PAXTON ET AL  2,016,945
CONTINUOUS GLASS MELTING TANK
Filed May 31, 1932   2 Sheets-Sheet 1
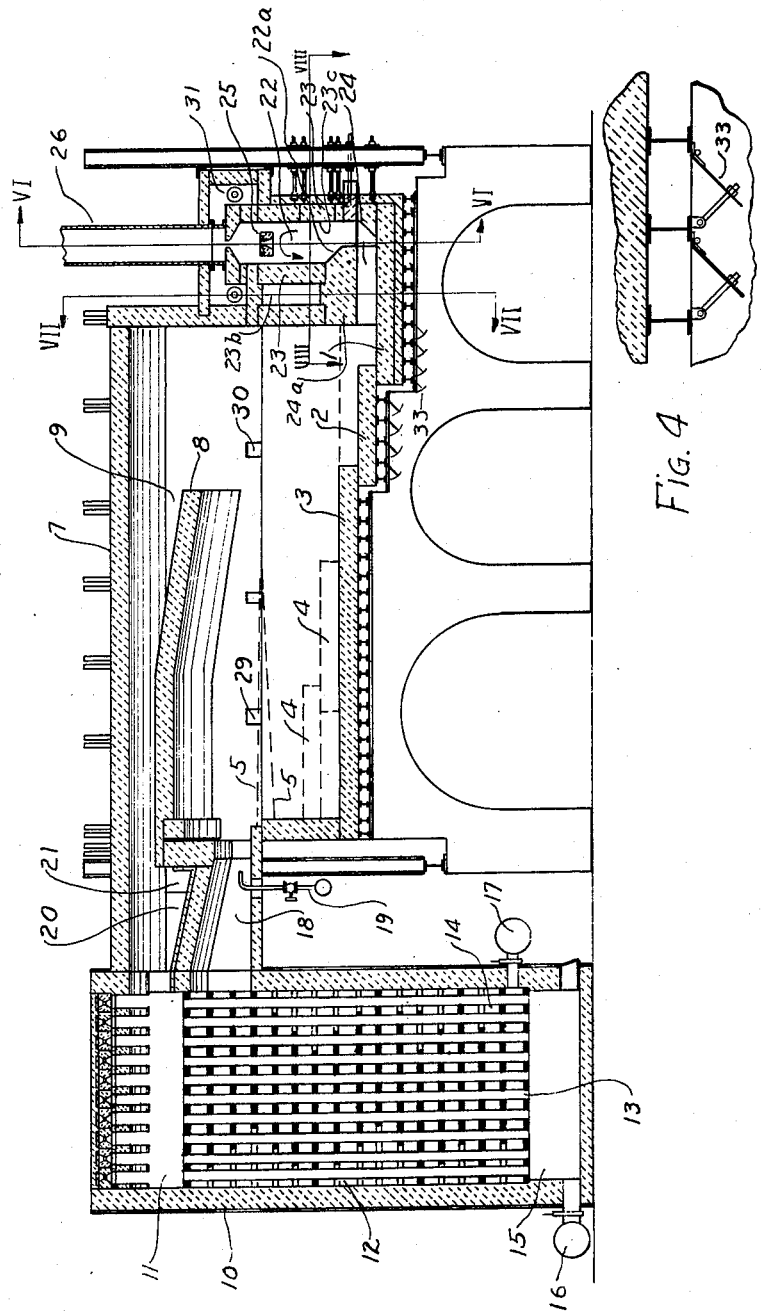
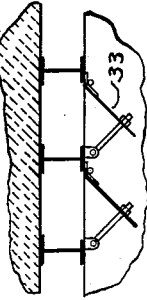
Fig. 4
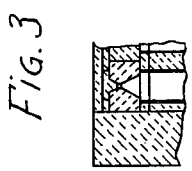
Fig. 3
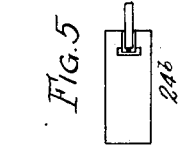
Fig. 5
INVENTORS
Elisha W. Paxton and
Arthur W. Schmid
BY William B. Jaspert
ATTORNEY Oct. 8, 1935.　　　E. W. PAXTON ET AL　　　2,016,945
CONTINUOUS GLASS MELTING TANK
Filed May 31, 1932　　　2 Sheets-Sheet 2
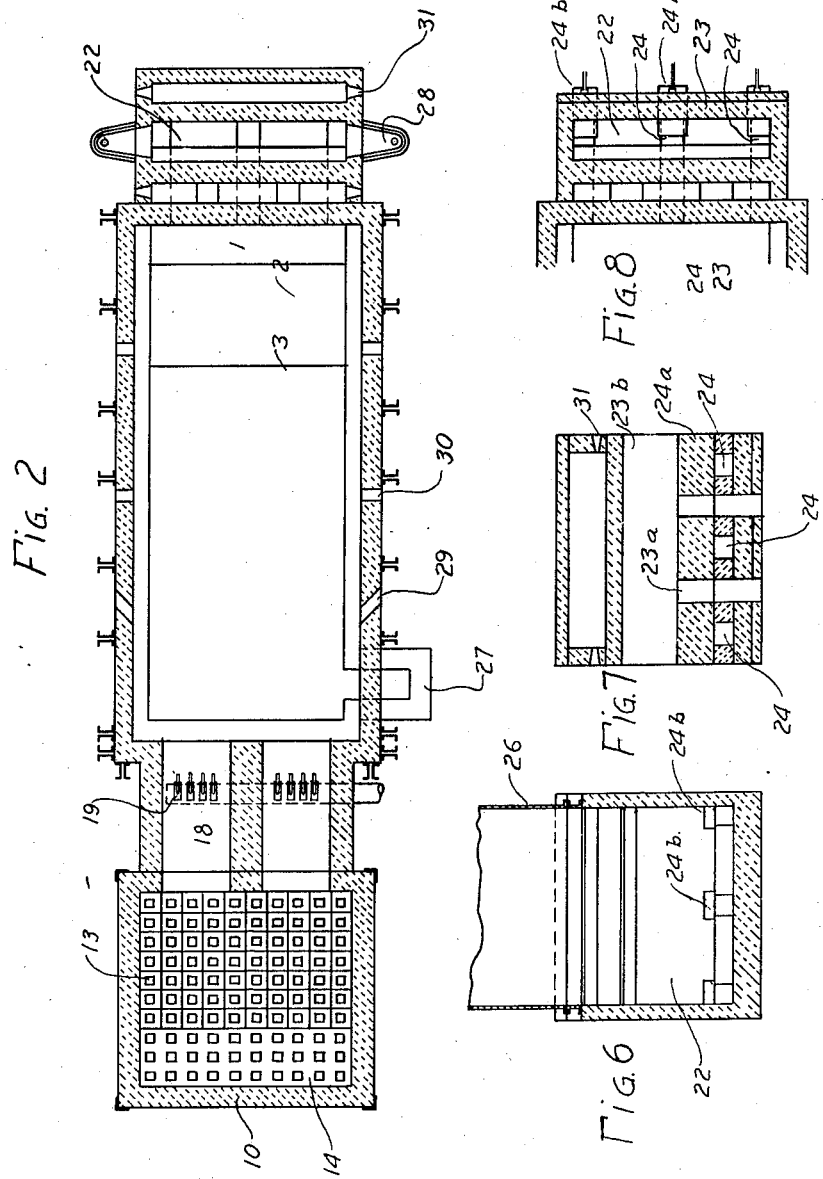
INVENTORS
Elisha W. Paxton and
Arthur W. Schmid
BY William B. Jaspert
ATTORNEY

Patented Oct. 8, 1935

2,016,945

UNITED STATES PATENT OFFICE 2,016,945

CONTINUOUS GLASS MELTING TANK

Elisha W. Paxton and Arthur W. Schmid, Washington, Pa., assignors to Amco, Incorporated, Pittsburgh, Pa., a corporation of Pennsylvania Application May 31, 1932, Serial No. 614,432

6 Claims. (Cl. 49—54)

This invention relates to improvements in tank structures for melting glass and more particularly to glass melting tanks adapted for use in making sheet glass by drawing or other forms of glassware by continuous process.

The aim of all glass manufacturers is a tank furnace that will deliver molten glass for working that shall be continuously and uniformly homogeneous as to chemical composition, temperature, specific gravity and age-under-heat. The usual designs of tank furnaces have, in many cases, completely failed, or at best have only succeeded at intervals, in producing satisfactorily homogeneous glass. This fact becomes increasingly important and annoying to the operators of the more and more completely automatic glass working machinery which characterizes modern manufacturing methods. This is due to the unvarying physical and mechanical characteristics of such machinery, it being much less easily adaptable to variations in the glass than manual operations. Satisfactory production on such machines is possible only during those periods when the tank furnace is delivering homogeneous glass. Lack of homogeneity in glass gives particularly bad results when operating machines embodying the principle of drawing, or in other words, causing the glass to assume a shape and thickness determined primarily by its rate of increase of viscosity and speed of draw, such as the flat drawing of window glass. Variations of rate of increase of viscosity, due to lack of homogeneity, cause the formation of lines, waves, variations in thickness and other defects in the product, thereby rendering it unsalable in whole or in part.

In as much as continuous automatic machine production requires the use of tank-type furnaces for furnishing a continuous supply of molten glass, the weaknesses inherent in former designs have come to be regarded as "necessary evils". The more important of these weaknesses are due to the following facts:

Stratification, occurring due to the selective action of variations in stage of planing, temperature, and chemical composition with their corresponding variations in the specific gravity of the molten glass.

The vertical temperature gradient, due to top heating which causes simultaneous existence in the tank of molten glass of wide temperature variations which may be as much as 100° F. or more per foot of depth.

The variation in viscosity of molten glass, inversely with temperature, is tremendous; the viscosity of a certain glass, for example, at 2000° F. being 32 times its viscosity at 2500° F., forty-one (41) times its viscosity at 2250° F., etc., while a glass of different chemical composition than that of the example cited will have its own peculiar viscosity characteristics, variations, and ratios.

The resistance of throat apertures, as regards cross sectional area and length, to flow of highly viscous glass has been too great to permit the requisite rate of flow of glass at the temperature and viscosity normally extant at the depth below the surface at which the throat apertures have been located.

Requisite rate of flow to permit the desired rate of production has heretofore been attained and accompanied by the automatic lowering of the working head between melting and working chambers, due to withdrawal of worked glass, to a point sufficient to cause the hotter, less viscous, more mobile glass that is extant and available above the level of the throat aperture in the melting chamber, to dive down below its normal stratum and pass through the said throat aperture.

Progressive increases in rate of production ultimately cause diving of the topmost, hottest stratum of glass, resulting in an increase of the horizontal component of motion towards the working chamber, of said top stratum. Further increases in rate of production merely serve further to increase horizontal velocities of top stratum glass toward the working chamber with consequent reduction in melting time of the glass batch, which melting time in this case will be substantially proportional to the quotient of glass bath area divided by average horizontal velocity multiplied by the average depth of said most rapidly moving top stratum glass, said increases in rate of production finally resulting in seedy unrefined glass flowing through the throat aperture and into the working chamber. This is usual practice, it being customary to progressively increase the rate of production until seedy glass appears, whereupon it is considered that tank melting capacity has been reached, when the rate of production has reached a point where the amount and/or size of seed in the glass becomes objectionable in the product being manufactured. Practically all tank furnaces are designed, rated, built and sold on such a basis, entire freedom from visible seed when the product demands such quality being merely a phase of the above outlined method of rating as excessive melting capacity is undesirable from an economic standpoint.

The temperature of glass moving through the throat aperture as stated above, coming as it does mainly from the highest, hottest strata in the melting chamber, is too high for working and, therefore, space for cooling said glass has had to be provided in the working chamber. It is impossible uniformly to cool such a moving mass of hot glass, or at the same time to keep it all moving at a uniform velocity on account of its comparatively low heat conductivity and tremendous increase in viscosity upon any reduction of its temperature. This results in stagnation in such a cooling-and-working-chamber, and in the delivery of thermally and chronologically heterogeneous glass to the machines.

The diving of hot, upper level glass described above also tends to the formation of a terrace of comparatively stagnant glass in the melting chamber which tends to become old-under-heat with consequent incipient or actual devitrification. Parts of this terrace continually slough off into the faster moving stream of hotter glass as it dives into the throat aperture, resulting in heterogeneity of the glass stream at this point also. Heated shut downs, with cessation of active flow, permit the terrace to ooze toward the throat aperture, in an attempt to level itself off according to specific gravity.

Resumption of operations then moves a considerable slug of this undesirable terrace glass through the throat aperture, and into the working chamber, aggravating an already unsatisfactory condition.

Graduated shading due to the varying opacity to radiation of the batch blanket, also tends to increase the slope, and hence the depth, of the terrace glass under said batch blanket.

The delicate flow balance between and among the various strata is established by the diving of the active flow through the throat aperture.

Tank furnaces heretofore have produced their most nearly homogeneous glass only when production rate and furnace temperatures have been held constant. Such conditions can only be maintained in actual factory practice for short periods, due to changes in production schedules, unavoidable variations in furnace temperatures, shut downs and other causes, unforeseen or otherwise, that will be familiar to those skilled in the art. When it is borne in mind that furnaces are usually operated to capacity when possible, as outlined above, to obtain maximum economy; and when it is clear that any change in furnace temperatures (and especially when upward from normal) heat penetration (and especially when deeper than normal) or production rate (and especially downward from normal) will greatly change the delicate flow balance previously established, resulting in the movement of the different strata at new absolute and relative velocities; and when it is further borne in mind that these strata have been formed due to selection according to specific gravity, and that the glass in many of these strata is undesirable due to chemical composition and/or age-under-heat due to slow movement, due to increased viscosity, it will be seen that a changing proportion of the lower strata glass entering the active flow will cause serious changes in glass composition and condition at the machines. Furthermore, it is well known that glass in commercial form is a supercooled, supersaturated solution of several silicates. When cooling is slow, or as herein expressed, when the glass reaches a too great age-under-heat, devitrification (crystallization of one or more of the dissolved silicates) becomes incipient or actually occurs, the crystals growing from ultra microscopic size to a size easily visible to the naked eye. When this begins to occur, the viscosity of the glass increases tremenduously, this latter increase being in addition to the normally great increase in viscosity of glass with reduction in temperature, so that at a given temperature and for a given chemical composition, fresh glass has a far lower viscosity than glass that is old-under-heat. It is this same fact that causes remelted cullet glass to be notoriously "stiff working" and "gummy". Several remelts of cullet glass alone always result in more or less complete devitrification, in which state, it becomes impossible to work the glass at all. It will thus be seen that when glass that is old-under-heat is moved into the working chamber, and to the machines it has an extra strong tendency to stagnate and completely to devitrify, as the lower temperatures in the working chamber offer increasingly favorable conditions for maximum rate of crystal growth. This causes an endless list of troubles in working the glass and completely destroys any hope of obtaining continuous homogeneity therein when stagnation is permitted to occur.

Changes in batch composition either intentional or due to errors in weighing out materials, imperfect mixing, subsequent separation of the mixed batch during handling and/or conveying, or variations in the chemical and/or physical characteristics of the raw material will also change the selection and stratification in the furnace. Changes in the composition, size and amount of cullet fed with the mixed batch will also have similar effects. Even the method of charging the batch as to the size of the batch piles and the consequent depth to which their submerged portions float in the glass batch will affect the selection and stratification in the furnace.

The method and control of firing with resulting presence or absence of localized convection and eddy currents in the glass and the type and temperature of flame as to degree of luminosity, and consequent proportion of loss of its heat to the glass by deep penetrating radiation, as opposed to conduction and convection, also is a considerable factor.

Indeed, the very complexity and number of the factors involved have undoubtedly prevented the earlier complete and satisfactory solution of the serious problems presented.

The present invention overcomes these difficulties by a new and useful furnace design and it is among the objects thereof to provide a melting and refining chamber having a deliberately selected depth adjacent a throat aperture such that a supply or reservoir of glass of the temperature desired for working will be made available for passage through said throat aperture to a working chamber.

A further object of the invention is the recognition and satisfaction of the law, that a viscous liquid, of constant viscosity under a constant head pressure, will flow at a definite constant velocity through an aperture of definite cross sectional area and definite length, by the provision of a throat aperture or apertures having a total resistance (as to cross sectional area and length) to glass flow, such that under normal furnace and temperature conditions, and at the maximum rate of production for which the furnace is designed, glass at the desired working temperature and viscosity can flow through said throat aperture fast enough to satisfy said maximum rate of production under the pressure of the minimum working head incident to such rate of production, which will insure that substantially no glass of a higher than the desired working temperature (and consequently from a higher level than that of the upper edge of the throat aperture) will flow through said throat aperture.

A further object of the invention is the provision of a working chamber that is in no sense a "refining chamber", "settling chamber", or "cooling chamber" but that is of dimensions that are at a minimum compatible with proper flow space to the glass working machinery, thus providing minimum opportunity for stagnation and/or cooling; and which shall preferably be as thoroughly insulated against heat losses as is practicable, in order to insure that active glass flow may be maintained adjacent the furnace blocks.

A further object is the provision for regulating and retarding the heat loss from the furnace bottom at the steps or stages under that part of the furnace responsible for producing and maintaining the reservoir of working temperature glass for the purpose of raising and/or varying the temperature of the glass in said reservoir section at a considerable depth.

A further object is the provision of a terraced bottom as an additional safeguard of homogeneity and to prevent the formation of the "terrace glass" under the batch blanket as previously described with its resultant tendency to advanced age-under-heat, slow progression toward the throat aperture, and pollution of the active glass stream, especially after heated shut-downs.

A further object is the provision of an extension of the throat lintel into the working chamber, where design permits, in order to bring the active channel or channels adjacent the insulated front wall of the working chamber whereby the rising glass stream entering the working chamber will have to flow under any descending stream of cooler glass caused by convection adjacent the opposite wall, insuring thorough mixing and promoting homogeneity.

A further object of the invention is the provision of a flow step to further safeguard against stratified flow through the throat itself when the proposed production rate necessitates a design providing maximum throat width and also a throat height approaching 12" to get sufficient cross sectional area.

Still a further object of the invention is the adjustment of resistance to flow.

These and other objects of the invention will become more apparent from a consideration of the accompanying drawings constituting a part hereof in which like reference characters designate like parts and in which:

Figure 1 is a vertical cross-sectional view taken longitudinally of a recuperative type glass melting tank and working chamber embodying the principles of this invention;

Figure 2 a top plan view thereof;

Figure 3 a detailed view of a portion of the roof of the recuperator structure;

Figure 4 an enlarged detail of the extreme right hand lower corner of the glass melting tank illustrating the louver arrangement of the wall for a purpose to be hereinafter stated;

Figure 5 a top plan view of a valve block employed in the flow channel to the working chamber;

Figure 6 a vertical cross-section taken along the line VI—VI, Figure 1;

Figure 7 a transverse section on the line VII—VII, Figure 1; and,

Figure 8 is a horizontal cross-section taken along the line VIII—VIII, Figure 1.

With reference to the several figures of the drawings, the structure therein illustrated comprises a glass melting tank having a staggered or stepped hearth or bottom wall consisting of the blocks 1, 2 and 3, an end wall 6 and a crown 7, the tank being shown as of the double crown type having an inner crown 8 which extends downwardly in the direction of the surface of the glass to direct the products of combustion and to further provide a waste gas passage 9 leading to a recuperator 10.

The recuperator is constructed of suitable refractory tile 12 which forms vertical flues or passages 13 and horizontal passages 14, the passages 13 extending from the upper distributing chamber 11 to a bottom chamber 15 from which the waste gases are exhausted through a damper regulated blower 16.

The horizontal passages 14 are air passages which communicate with a blower 17, also damper regulated, to control the amount of air entering the recuperator, such air passing back and forth horizontally and upwardly in a vertical direction into the combustion chamber 18 where it co-mingles with the gaseous fuel or oil supplied by the banks of burners 19.

A slag pit 20 is provided adjacent the chamber 11 of the recuperator to precipitate and accumulate the solid particles entrained in the waste gases leaving the melting chamber, such particles being removed at intervals through an opening 21 provided therein.

The front of the melting chamber is provided with a working chamber designated by the reference character 22 which chamber is of relatively small capacity and is insulated against heat loss by suitable means such as refractory tile blocks 23 having air spaces 23—a and 23—b in the region of the passages 24. Chamber 22 communicates with the melting chamber of the tank by one or more throats or passages 24 in the bridge wall 24—a adjacent the bottom 1 of the tank. The bottom of the working chamber 22 is provided with a shoulder 22—a constituted by an extension of the throat lintel into the working chamber to direct the flow of the glass from throat 24 against the outer wall 23—c.

The working chamber illustrated in the drawings is a chamber adapted for the drawing of the glass through a debiteuse block 25 into a vertical housing 26 through which the glass is passed in sheet form and properly annealed. The working chamber 22 is provided with overflows 28 adjacent the level of the debiteuse block 25 to constantly draw off glass adjacent working surface to prevent stagnation and devitrification around block 25 where normal machine operation does not move the glass and the overflow will supply cullet while maintaining the circulation. Movable blocks 24—b may be provided to vary the resistance of the throat or throats to glass-flow, and thus to control the rate of glass-flow into the working chamber.

A dog house 27, Figure 2, is provided at the rear end of the melting tank for feeding batch material into the tank and peep holes 29 and 30 are provided in the side wall of the melting tank. Burner ports 31 are provided in the working chamber at the upper part thereof to apply heat around the upper refractory material to maintain it at substantially the temperature of the working glass.

The bottom 1 of the melting chamber and the adjacent blocks 2 and 3 of the melting chamber are partly provided with a louver arrangement 32 more clearly shown in Figure 4 of the drawings, the louver arrangement structure comprising hinged shutter-like members 33 which can be opened or closed to vary the rate of heat radiation from the refractory material thereby getting a temperature control at the critical zone of the glass.

As shown by dotted lines 4, 4' in Figure 1 the entire tank bottom may be stepped to vary the depth of the glass in accordance with the thickness or opacity of the batch material as indicated by dotted lines 5, 5'.

The operation of the above described apparatus is briefly as follows:

The batch material is fed through the dog house 21 to rear end of the melting chamber onto the glass contained in the tank above the region of block 4'. The firing characteristics are regulated by means of the air blower 17 and the burners 19 to obtain the desired melting temperature in the melting chamber, and by means of the exhaust blower 16, the products of combustion from the burner port 18 will be drawn forward across the top of the glass in the tank, and on account of the downwardly depending character of the inner crown 8, the heating flame will be directed to the surface of the batch material on the glass in the tank. The waste gases will be drawn through the flared passage 9 into the recuperator chamber 11 from which they will pass downwardly through the tubes 13 and exhaust at 16.

One of the features of the tank is the elimination of the so-called "terrace" glass which is caused by the shading of the batch material 5, 5' on top of the molten glass in the tank. For example, the batch material will be the thickest adjacent the dog house where it is fed into the glass tank and this portion of the pool is made particularly shallow so that the heat will not have to penetrate any great distance to maintain the molten glass below the batch at such temperature as to prevent stagnation and devitrification. As the batch flows in a forward direction, its chemical change and higher temperature renders it less and less opaque and its shading effect is reduced so that the portion of the tank which it covers may be made somewhat deeper than the initial depth, this being done by the use of the step blocks 2, 3 and 4.

As the batch travels still further, the materials will be melted and the opacity will be still less so that gradually increasing depth of glass may be maintained without producing stagnant glass at the bottom of the tank, and this is particularly important in considering any heated shut-downs to which the tanks are subjected at which time no batch material is usually fed into the tank. In such a case, when all the batch is melted, the shading effect will be eliminated, resulting in the bottom glass (formerly shaded by the batch) being heated to such temperatures (in a tank of uniform depth) as to cause its displacement toward the working chamber of the tank with the result that when the operations are subsequently continued, this old-under-heat glass will pass into the working chamber resulting in inferior and unusuable products.

Since the glass along the entire bottom of the "terraced" hearth is of substantially the same viscosity and temperature the elimination of the shading effect of the batch blanket, and consequent elevation of temperature of the bottom glass formerly thereunder can have no bad effects, since this glass has not been allowed to remain cool to the point of stagnation and excessive age-under-heat.

The melting chamber of the tank is so designed as to depth that the portion of the glass between the upper level of the block 3 and the bottom of block 2 is of the proper working temperature and viscosity and the provision of the flow step by lowering block 1 assures that all the glass flowing into the throat or passage 24 will be at the proper working temperature and viscosity provided, of course, that the resistance of flow through the passage 24 is such that the flow cannot exceed the rate at which glass of the desired temperature is accumulated above the block 2.

By means of the lintel 22—a, the flow to passage 24 is conducted against the outer wall 23—c and thence upwardly into the working chamber so that any glass that may cool and tend to return downwardly, due to convection as indicated by the arrow will have to do so adjacent the inner wall and will thus descend on top of the incoming warmer glass of the passage 24, causing it to be reconditioned and recirculated to prevent stagnation and devitrification.

By means of the overflow members 28 provided adjacent the working surface of the glass, the glass at the top portion of the working chamber is continuously drawn off from around the sides of the debiteuse block and such overflow forms useful cullet and further assures that there will be no stagnant glass formed between the debiteuse block and the side walls of the working chamber, which ordinarily requires frequent shut-downs for the removal of the devitrified stagnant glass, to prevent its accumulation to a point where it would enter into and pollute the flow stream of the glass entering the debiteuse block.

Said overflow members also have an important function during heated shut-downs and subsequent resumption of operations. By keeping them operative, or even increasing their rate of discharge during such shut-downs, working temperature glass will continue to enter the working chamber which will by this means be maintained in satisfactory thermal condition, such means being far superior to any attempt at maintaining temperatures, or reheating to proper temperatures by means of burners or other heating means.

If desired, the movable blocks 24—b may be adjusted to constrict the flow passage from the throat 24 to the interior of the working chamber but the normal design of the working chamber contemplates that the glass passing to the throat 24 be directed against the wall 23—c of the chamber.

By this provision, the glass being circulated within the working chamber requires no heating means as the heating would be very difficult in view of the fact that the heat from the burners 31 at the top would not ordinarily penetrate the glass a very great distance below its surface.

By adjusting the louvers 33 below the reservoir step of block 2, and the flow step of block 1, it is possible to obtain a temperature variation of the refined glass before it enters the throat of passage 24 thereby effecting some correction in case the glass is not of the exact temperature at which it is desired to have it enter the working chamber.

Another important feature of the invention is the isolation of the working chamber and the finished glass from the melting chamber atmosphere to avoid surface adsorption of alkaline furnace gases by the finished product thereby eliminating the stains or so-called iridescence, the prevention of which has heretofore required that the product be washed with acid (a costly procedure) to neutralize the alkaline surface.

It will be evident from the foregoing description of this invention that by providing for removal from the melting chamber of glass adjacent the bottom of said chamber exclusively, the horizontal component of motion toward the working chamber of the top strata of glass in the melting chamber is reduced to a minimum, resulting in more effective heat adsorption and a more nearly vertical sinking of the glass upon getting rid of the seed, in direct opposition to the tendency of the seed to rise vertically. This provision also establishes a heat reservoir in the upper strata of glass since this glass is not moving rapidly over and away from the "melting area" of the glass, both as heretofore, carrying its sensible heat with it. These features result in greater ease in maintaining uniform furnace temperatures and are productive of increased furnace melting capacity in proportion to the "melting area".

This furnace design thus utilizes the entire volume of the glass bath in the melting process instead of mainly the top surface area as heretofore, for the reason that the glass is constantly drawn upon from the bottommost stratum exclusively. The furnace design is further effective in saving fuel as an alternate to increased melting capacity, since the working glass is being drawn entirely from levels that already exist and which are already kept at the proper temperature.

Although the invention has been features in connection with a melting tank having a stepped hearth, it will be obvious to those skilled in the art that it is equally applicable to a flat bottomed hearth, although perhaps less effective, when so applied.

We claim as our invention:

1. A glass melting and working apparatus comprising a melting chamber having an expanded refined glass accumulating area and a working chamber having a bridge wall therebetween, a throated passage through said bridge wall at the bottom of said area and working chamber and establishing communication therebetween, said throated passage having a total resistance to the glass flow so that the normal rate of flow of glass drawn therethrough shall be no greater than the desired rate of flow of the glass at the viscosity and temperature at which it accumulates adjacent the bottom of the bridge wall in the melting chamber.

2. Apparatus for melting and working glass comprising a melting chamber and a working chamber, the working chamber being of relatively small volume compared with the melting chamber, a bridge wall dividing said chambers having one or more throated passages extending therethrough at the bottom of said melting and working chambers, the hearth of said melting chamber having a normal depth portion and an abnormal depth portion forming a well for accumulating refined glass at desired working temperatures and viscosity adjacent the bridge wall at the bottom thereof, and said throated passage being of such area that the resistance to the desired rate of flow of the glass drawn therethrough shall not be in excess of the normal rate of flow for the viscosity of the glass contained in the bottom of said wall.

3. Apparatus for melting and working glass comprising a melting chamber, a working chamber, a bridge wall dividing said chambers having a throated passage extending therethrough at the bottom thereof to establish communication between said chambers, means extending into said passage and adapted for adjustment to vary resistance to flow of the glass to the working chamber, and means beneath the melting chamber and passage for regulating the working temperature of the glass before and as it passes into said passages to the working chamber.

4. Glass melting and working apparatus comprising in combination a melting chamber and a working chamber, a bridge wall dividing said chambers, and a plurality of throated passages establishing communication between said chambers through said bridge wall at the bottom thereof, said throated passages having adjustable flow resistance relative to each other to regulate the glass flow so that the glass flow therethrough will not exceed the normal rate of flow at the working temperature and viscosity of the glass adjacent the bottom of the melting tank.

5. The method of melting and selecting desirable homogeneous glass from a continuous tank furnace which comprises feeding and melting raw materials to and in the rear portion of a pool of glass in a tank of varying depth, flowing the glass from the bottom of the pool toward an outlet at the bottom of the pool remote from the materials feeding end to gradually separate the melting materials and the melted portions thereof by precipitating the denser melted and refined portions toward the bottom of the pool, flowing the melted glass from the tank outlet to a working tank, maintaining substantially uniform melting temperature throughout the varying depth of the glass pool, and regulating the temperature of the refined metal in the working tank independent of the temperature of the melting raw materials to coincide with a desired temperature.

6. In the process of delivering glass from the refining area of a glass melting furnace to the working chamber, the steps which consist of delivering refined homogeneous glass to the working chamber by withdrawing it from the melting chamber at the depth at which the viscosity and temperature of the glass corresponds to that at which it is worked, and withdrawing the refined glass at such rate of flow that the volumetric displacement of the glass between the melting furnace and working chamber is not in excess of the normal rate of accumulation of the refined glass at the rated melting capacity of the furnace.

ELISHA W. PAXTON.
ARTHUR W. SCHMID.